United States Patent
Fang et al.

(10) Patent No.: US 10,755,013 B1
(45) Date of Patent: Aug. 25, 2020

(54) AUTOMATIC CREATION OF HIGH-LEVEL LANGUAGE CALLABLE LIBRARY FOR A HARDWARE CORE

(71) Applicant: Xilinx, Inc., San Jose, CA (US)

(72) Inventors: Zhenman Fang, Campbell, CA (US); James L. Hwang, Portola Valley, CA (US); Samuel A. Skalicky, Cupertino, CA (US); Tom Shui, Mountain View, CA (US); Michael Gill, Campbell, CA (US); Welson Sun, San Jose, CA (US); Alfred Huang, Fremont, CA (US); Jorge E. Carrillo, San Jose, CA (US); Chen Pan, Bothell, WA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/189,919

(22) Filed: Nov. 13, 2018

(51) Int. Cl.
*G06F 30/34* (2020.01)
*G06F 8/41* (2018.01)
*G06F 30/327* (2020.01)

(52) U.S. Cl.
CPC .............. *G06F 30/34* (2020.01); *G06F 8/447* (2013.01); *G06F 30/327* (2020.01)

(58) Field of Classification Search
USPC ........................................................ 716/104
See application file for complete search history.

(56) References Cited

U.S. PATENT DOCUMENTS

| | | | |
|---|---|---|---|
| 8,762,916 B1 | 6/2014 | Kathail et al. | |
| 8,775,986 B1* | 7/2014 | Mohan | G06F 17/5054 716/104 |
| 9,075,624 B2* | 7/2015 | Carrillo | G06F 8/41 |
| 9,223,921 B1* | 12/2015 | Carrillo | G06F 17/5054 |
| 2016/0364506 A1* | 12/2016 | Harper | G06F 17/5081 |
| 2017/0116355 A1* | 4/2017 | Harper | G06F 17/5081 |
| 2017/0177780 A1* | 6/2017 | Harper | G06F 17/5081 |
| 2018/0060473 A1* | 3/2018 | Adler | G06F 17/5045 |

OTHER PUBLICATIONS

Xilinx, "SDSoC Environment User Guide," UG1027 (v2018.1), Apr. 4, 2018, pp. 1-132, in particular pp. 99-110, Xilinx, Inc., San Jose, California, USA.
Xilinx, "SDSoC Environment User Guide," UG1027 (v2017.2), Aug. 16, 2017, pp. 1-133, in particular pp. 31-40, Xilinx, Inc., San Jose, California, USA.
Specification and drawings for U.S. Appl. No. 16/189,939, filed Nov. 13, 2018, Fang et al.

* cited by examiner

*Primary Examiner* — Mohammed Alam

(74) *Attorney, Agent, or Firm* — Kevin T. Cuenot

(57) ABSTRACT

Creating a high-level language (HLL) callable library for a hardware core can include automatically querying, using computer hardware, a metadata description of a core to determine a plurality of available ports of the core, automatically determining, using the computer hardware, an argument of a first function specified in a header file corresponding to the core, mapping, using the computer hardware, the argument to a first port of the plurality of available ports, and automatically generating and storing, using the computer hardware, an HLL library specifying a mapping of the argument to the first port of the core. The HLL library is configured for inclusion with a user application during compilation.

18 Claims, 10 Drawing Sheets

400

| | |
|---|---|
| Project Name: | mylib |
| Project flow: | C-Callable |
| Target FPGA: | Zynq |
| Platform: | zc702 ... |
| Runtime: | C/C++ |
| System configuration: | Linux ... |
| Domain: | linux |
| CPU: | cortex-a9 |
| OS: | linux |

404  406

| IP Customizations: | | | |
|---|---|---|---|
| Header file/Function | IP | Accelerator Control | Function Mapping |
| | | 402 | |

| Header File: | 502 | Select | Browse... |
| RTL Core Path: | 504 | Select | Browse... |

Accelerator Control:

Protocol: 506 ▽

Primary Clock:

Min Clock Period (ns): 508

Derived Clock(s):

Clock Period Multiplier: 510

Clock Period Divisor: 512

| Header file/Function | IP | Accelerator Control | Function Mapping |
|---|---|---|---|
| fir.hpp | component.xml | none | |
| 404 ||||

FIG. 6

| Header file/Function | IP | Accelerator Control | Function Mapping |
|---|---|---|---|
| fir.hpp | component.xml | none | |
| fir | | | X=S_AXIS_DATA:in;Y=M_AXIS_DATA:out; |
| 402 | | | |

AUTOMATIC CREATION OF HIGH-LEVEL LANGUAGE CALLABLE LIBRARY FOR A HARDWARE CORE

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to automatically creating a high-level language callable library for accessing a hardware implementation of a core within an IC.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes programmable circuitry implemented as an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

In some cases, a programmable IC also includes an embedded processor system. The processor system can include a processor (e.g., central processing unit or "CPU") coupled to memory. The memory is capable of storing program code and/or data. The processor is capable of accessing the memory to execute the program code and operate on the data. Further, the processor system is capable of interacting with circuitry and/or other systems implemented using the programmable circuitry of the programmable IC. A programmable IC of this variety is also called a System-on-Chip (SoC).

One benefit of using an SoC is that a task that can be implemented in software, e.g., as an executable process performed by the processor system, can be offloaded to a circuit implemented in the programmable circuitry. The circuit is functionally equivalent to program code that can be executed by the processor system to perform the task. The circuit, however, often provides one or more benefits that are not attainable through execution of the program code by the processor system. The benefit(s) can include faster operation, reduced power consumption, redundancy, etc. Despite the fact that the benefits may or may not include faster operation, the circuit is often referred to as a "hardware accelerator".

Hardware accelerators are often made available to users as cores. In order to utilize a hardware accelerator, an application executed by the processor system must be able to invoke the hardware accelerator in the programmable circuitry of the SoC. One technique for accessing the hardware accelerator from the application is to manually write a software driver that allows the application to control the hardware accelerator through a register interface. The hardware accelerator, however, cannot be automatically inserted into hardware (e.g., a circuit design for the programmable IC) using hardware generation tools because there is no binding between the functions intended to access the hardware accelerator and the interfaces of the hardware accelerator.

In some cases, a user is able to manually generate metadata that specifies the missing bindings. Hardware generation tools are capable of using the metadata to create a static library that can be linked into an application. Creating the necessary metadata, however, is a manual process that is both time consuming and error prone. Moreover, to accurately create the metadata, e.g., manually write Extensible Markup Language (XML) files, the user must have significant knowledge of the hardware interfaces of the hardware accelerator. Often, the user wishing to access the hardware accelerator from an application is a software developer that lacks the necessary hardware expertise to understand operation of the hardware accelerator and to manually go through the hardware accelerator documentation in order to create the metadata necessary to generate the static library.

SUMMARY

In one or more embodiments, a method can include automatically querying, using computer hardware, a metadata description of a core to determine a plurality of available ports of the core, automatically determining, using the computer hardware, an argument of a first function specified in a header file corresponding to the core, mapping, using the computer hardware, the argument to a first port of the plurality of available ports, and automatically generating and storing, using the computer hardware, a high-level language (HLL) library specifying a mapping of the argument to the first port of the core. The HLL library is configured for inclusion with a user application during compilation.

In one or more embodiments, a system includes a processor configured to initiate operations. The operations can include automatically querying a metadata description of a core to determine a plurality of available ports of the core, automatically determining an argument of a first function specified in a header file corresponding to the core, mapping the argument to a first port of the plurality of available ports, and automatically generating and storing a HLL library specifying a mapping of the argument to the first port of the core. The HLL library is configured for inclusion with a user application during compilation.

In one or more embodiments, a computer program product includes a computer readable storage medium having program code stored thereon. The program code is executable by a processor to perform operations. The operations can include automatically querying a metadata description of a core to determine a plurality of available ports of the core, automatically determining an argument of a first function specified in a header file corresponding to the core, mapping the argument to a first port of the plurality of available ports, and automatically generating and storing a HLL library specifying a mapping of the argument to the first port of the core. The HLL library is configured for inclusion with a user application during compilation.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 is an example graphical user interface (GUI) that can be generated and displayed on a display device by a system as described in connection with FIG. 1.

FIG. 5 is an example GUI that can be generated and displayed on a display device by a system as described in connection with FIG. 1.

FIG. 6 is an example GUI that can be generated and displayed on a display device by a system as described in connection with FIG. 1.

DETAILED DESCRIPTION

Figure 1:
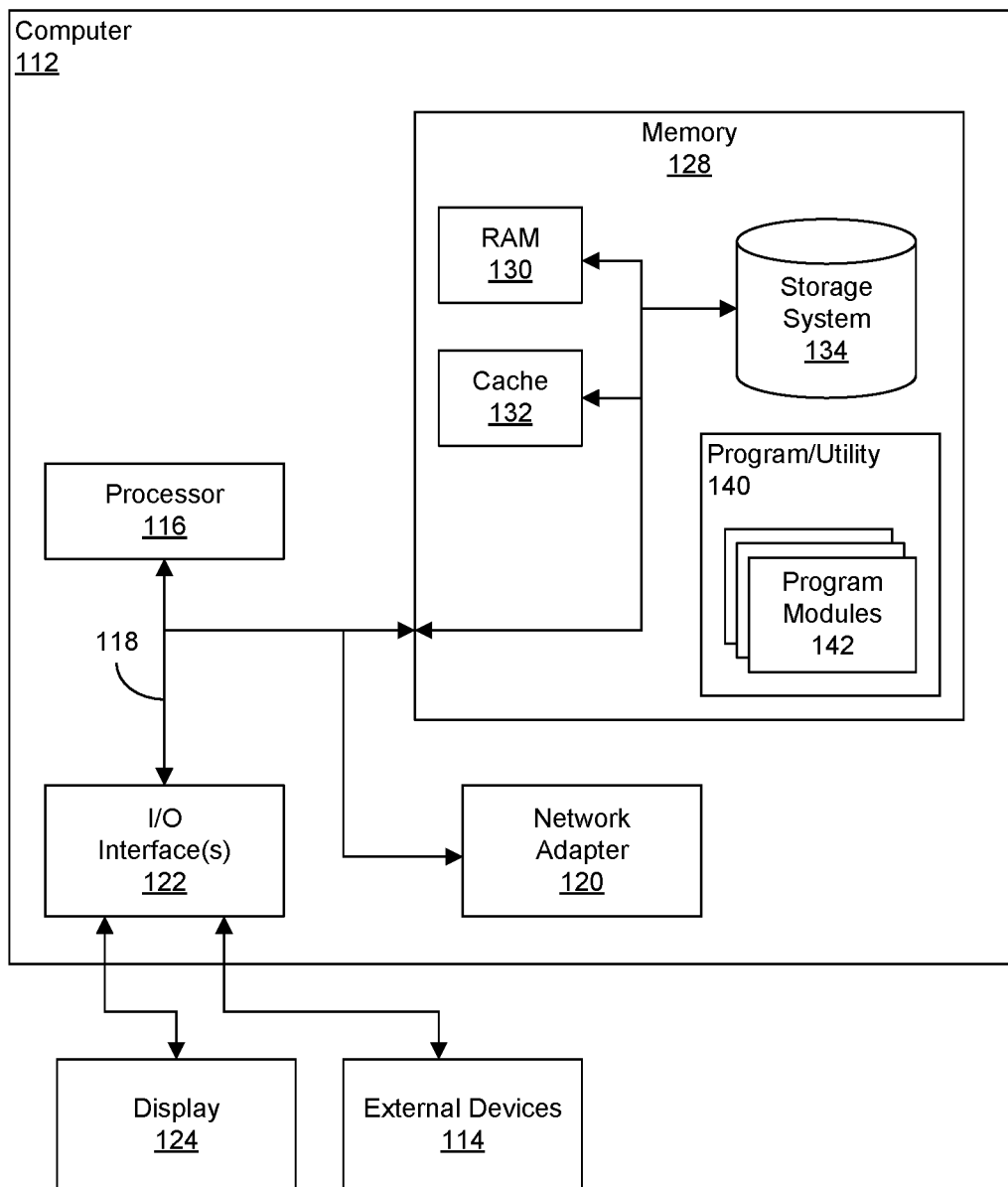
FIG. 1 illustrates an example computing system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to automatically creating a high-level language (HLL) library for accessing a hardware implementation of a core implemented within an IC. For example, a user application can be compiled to execute in a processor system, while the core referenced by the user application can be included in a circuit design that is physically implemented in hardware, e.g., as a hardware accelerator, within an IC. The IC can be a programmable IC such as a field programmable gate array (FPGA), a dedicated application-specific integrated circuit (ASIC), or a System-on-Chip (SoC) that includes an embedded processor system and programmable circuitry. The user application is executed by a processor system, whether embedded in the IC or implemented as a separate data processing system coupled to the IC, while the hardware accelerator is implemented in circuitry (e.g., the ASIC and/or programmable circuitry). In order for the user application to access the hardware implementation of the core, an HLL library is needed that can be incorporated into the user's application.

In accordance with the inventive arrangements described within this disclosure, an automated process is disclosed whereby metadata is generated that correlates arguments of HLL functions declared in a header file with the interface(s) of a core. A computing system (system) is capable of analyzing the core to determine information such as the available interfaces of the core. The system is capable of automatically determining arguments for one or more of the declared HLL functions from the header file. The arguments can be matched to appropriate interfaces of the core.

In one or more embodiments, the system is capable of performing error checking on the matched arguments of the HLL functions and the interfaces of the core. For example, the system is capable of automatically determining parameters for the interfaces of the core and attributes of the arguments of the HLL function. The system can check compatibility between the matched arguments and the interfaces based upon a comparison of the parameters of the interfaces with the attributes of the arguments. By performing error checking, any argument of an HLL function that is incompatible with the interface of the core to which the argument is mapped can be determined prior to generating metadata for the HLL library and attempting compilation of the user application with the HLL library. This means that errors are found prior to the user undertaking a lengthy software compilation and/or hardware compilation process or, worse, only finding the error after the design is implemented into the IC. As such, performing error checking at this stage can save significant amounts of development time and avoid coding/implementation errors that manifest as bugs in the implemented (e.g., physical circuit design).

In particular embodiments, the system is capable of mapping multiple different HLL functions to a same core. Program code for an application can include one or more function calls. A system is able to determine that each of the function calls corresponds to a same core and, in response, implements one instance of the core to which each of the multiple different functions is mapped in hardware.

In general, the user's HLL application is capable of driving hardware generation. For example, the system is capable of analyzing the application, e.g., at compile time, to identify particular cores referenced in the application. The system is capable of creating a circuit design that includes the referenced cores and any necessary data mover circuitry connecting the cores to the processor system and the hardware implementation of the core. The system is capable of generating an executable version of the user's application and a placed and routed version of the circuit design that implements the cores utilized by the application.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a computing node 100. Computing node 100 is only one example implementation of a computing node that can be used in a standalone capacity, as part of a computing cluster, or as a cloud computing node. The example of FIG. 1 is not intended to suggest any limitation as to the scope of use or functionality of the embodiments described herein. Computing node 100 is an example of a system and/or computer hardware that is capable of performing the various operations described within this disclosure. Computing node 100, for example, is capable of creating an HLL library, compiling an application, generating a circuit design, and implementing the compiled application and circuit design in an IC. In one example, the IC has an architecture the same as or similar to the architecture described in connection with FIG. 12.

Computing node 100 includes a computer 112, which is operational with numerous other general purpose or special purpose computing system environments or configurations. Examples of computing systems, environments, and/or configurations that may be suitable for use with computer 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer 112 can be described in the general context of computer system-executable instructions, such as program modules, being executed by a computer system. Generally, program modules can include routines, programs, objects, components, logic, data structures, and so on that perform particular tasks or implement particular abstract data types. Computer 112 can be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer 112 in computing node 100 is shown in the form of a general-purpose computing device. The components of computer 112 can include, but are not limited to, one or more processors 116, a memory 128, and a bus 118 that couples various system components including memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer 112 typically includes a variety of computer system readable media. Such media may be any available media that is accessible by computer 112 and can include both volatile and non-volatile media, removable and non-removable media.

Memory 128 can include computer system readable media in the form of volatile memory, such as random-access memory (RAM) 130 and/or cache memory 132. Computer 112 can also include other removable/non-removable, volatile/non-volatile computer system storage media. By way of example, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 can include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Program modules 142 generally carry out the functions and/or methodologies of embodiments of the invention as described herein.

For example, one or more of the program modules can generate a HLL library, generate a circuit design, compile a user application, and/or implement the circuit design within an IC. Program/utility 140 is executable by processor 116. Program/utility 140 and any data items used, generated, and/or operated upon by computing node 100 are functional data structures that impart functionality when employed by computing node 100. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system/server 112 can also communicate with one or more external devices 114 such as a keyboard, a pointing device, a display 124, etc.; one or more devices that enable a user to interact with computer 112; and/or any devices (e.g., network card, modem, etc.) that enable computer 112 to communicate with one or more other computing devices. Such communication can occur via Input/Output (I/O) interfaces 122. Still yet, computer 112 can communicate with one or more networks such as a local area network (LAN), a general wide area network (WAN), and/or a public network (e.g., the Internet) via network adapter 120. As depicted, network adapter 120 communicates with the other components of computer 112 via bus 118. It should be understood that although not shown, other hardware and/or software components could be used in conjunction with computer 112. Examples, include, but are not limited to: microcode, device drivers, redundant processing units, external disk drive arrays, RAID systems, tape drives, and data archival storage systems, etc.

Figure 2:
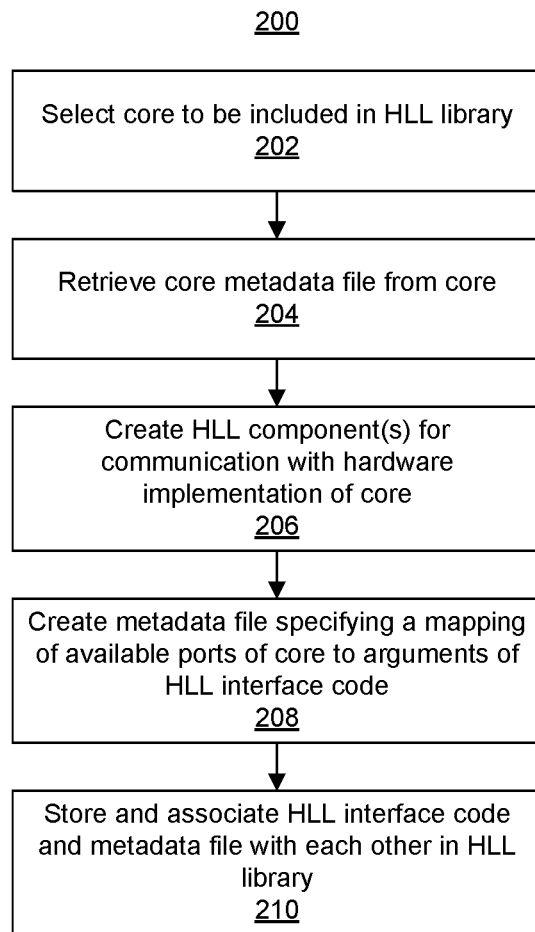
FIG. 2 illustrates an example method for generating a high-level language (HLL) library for a core.

FIG. 2 illustrates an example method 200 for generating an HLL library for a core. Method 200 can be performed by a system the same as or similar to the system described in connection with FIG. 1.

In one or more embodiments, the core is specified as a package file. The package file can include a plurality of different files and file types. Further, the core can be hierarchically ordered, e.g., have an internal hierarchy or directory structure, such that additional child cores are included therein. In one example, the package file can include one or more register transfer level (RTL) source files, one or more HLL source files, one or more simulation models, and/or one or more hardened components that may be available on the IC and/or in a processor system embedded on the IC. The package file can also include one or more metadata files.

In the case where the package file includes one or more RTL source files, the RTL specifies a hardware implementation of the core. The RTL source files, for example, can be specified in a hardware description language or as a netlist. In the case where the package file includes one or more HLL source files, the HLL source files can include an header file. In another example, the HLL source files can include template files.

In one example, each metadata file specifies a description of one or more components in the core. For example, a metadata file can specify a description of RTL source file(s) in the core. For purposes of description, the metadata file(s) included in the core are referred to herein as "core metadata file(s)". For example, a core metadata file can be specified as an Extensible Markup Language (XML) file and can specify available ports of the core, parameters of the ports, and the like. In some cases, the core can include additional files such as, for example, a testbench, documentation, and/or a simulation model.

In block 202, the system selects a core to be included in the HLL library. The core, for example, specifies a hardware accelerator that is to be accessed by an HLL user application. The core can be included in a circuit design that is generated to communicate with the user application that will execute in the processor system of the target IC. In block 204, the system retrieves the core metadata file from the core.

In block 206, the system generates one or more HLL components for communication with a hardware implementation of the core. In one or more embodiments, the system generates HLL interface code templates for communication with the circuit design to be generated that will include the core. Each interface code template can specify a function having the same arguments as an HLL function call to the core. In some implementations, the body of the interface code template includes code to facilitate communication of arguments and a respective port of the circuit design. The communication code can include various parameters that can be reconfigured at compile time. For instance, parameters can be adjusted to accommodate various data lane width and/or protocols used to bridge and route signals to the circuit design. In some other implementations, the body of the HLL interface code template is initially empty. The system is capable of generating and adding code to the body at compile time. Code that can be included in or added to the body of the interface code template is discussed in more detail in connection with FIG. 10.

In particular embodiments, each function for which an HLL interface code template is generated is determined by the system from a header file that corresponds to the core. The header file, for example, can be stored within or as part of the core. The header file can be specified in an HLL such as C or C++. For example, the header file can be a *.hpp file or a *.h file. Example 1 below illustrates an excerpt of a header file for a core. As shown, the header file declares multiple functions for the core. In Example 1, the header file is for a core that implements a Finite Impulse Response Filter (fir). For each function, arguments are specified and attributes of the arguments.

Example 1 void fir_reload(signed char H[ ])
void fir_config(signed char C[ ])
void fir(short X[ ], int Y[ ])

Referring to Example 1, the system creates an HLL interface code template for each of the "fir_reload", "fir_config" and "fir" functions specified in the header file.

In one or more other embodiments, the creation of HLL components can work in reverse. For example, the system is capable of generating a header file automatically from one or more existing interface code templates. In any case, at the conclusion of block 206, the system has both a header file and one or more interface code templates.

In block 208, the system is capable of automatically creating a metadata file specifying a mapping of available ports of the core to arguments of the HLL interface code. For purposes of description, the metadata file generated in block 208 is referred to herein as a "mapping metadata file". In one or more embodiments, the mapping metadata file is implemented as an XML file. In one or more embodiments, the system generates a single mapping metadata file including mapping data for a plurality of different functions of a core. In one or more other embodiments, the system generates a plurality of mapping metadata files, e.g., where each mapping metadata file corresponds to a different function.

Optionally, the system adds parameter information to the mapping metadata file indicating configuration settings to be used when creating the circuit design. The mapping metadata file specifies a mapping between the arguments of the functions of the header file (e.g., the arguments of the HLL interface code templates) and the available ports of the core. The information can indicate, for example, a name of the core, a name or reference pointer for the argument(s) of the functions; a direction of data flow (e.g., to the argument or to the port or input or output); a bus interface reference name of a port, an interface type of the port; a data width of the connection; a number of elements in an array argument; a latency estimation for the hardware implementation, and/or an estimation of resources required for the connection.

In block 210, the system stores the HLL interface code templates with the mapping metadata file(s) in memory in association with each other to form an HLL library for the core. It should be appreciated that the system is further capable of storing the HLL library in association with the particular core or cores for which the HLL library was generated. Subsequently, when creating an HLL user application, the HLL library can be included within the user application to facilitate communication and control of the hardware implementation of the core within the target IC.

Figure 3:
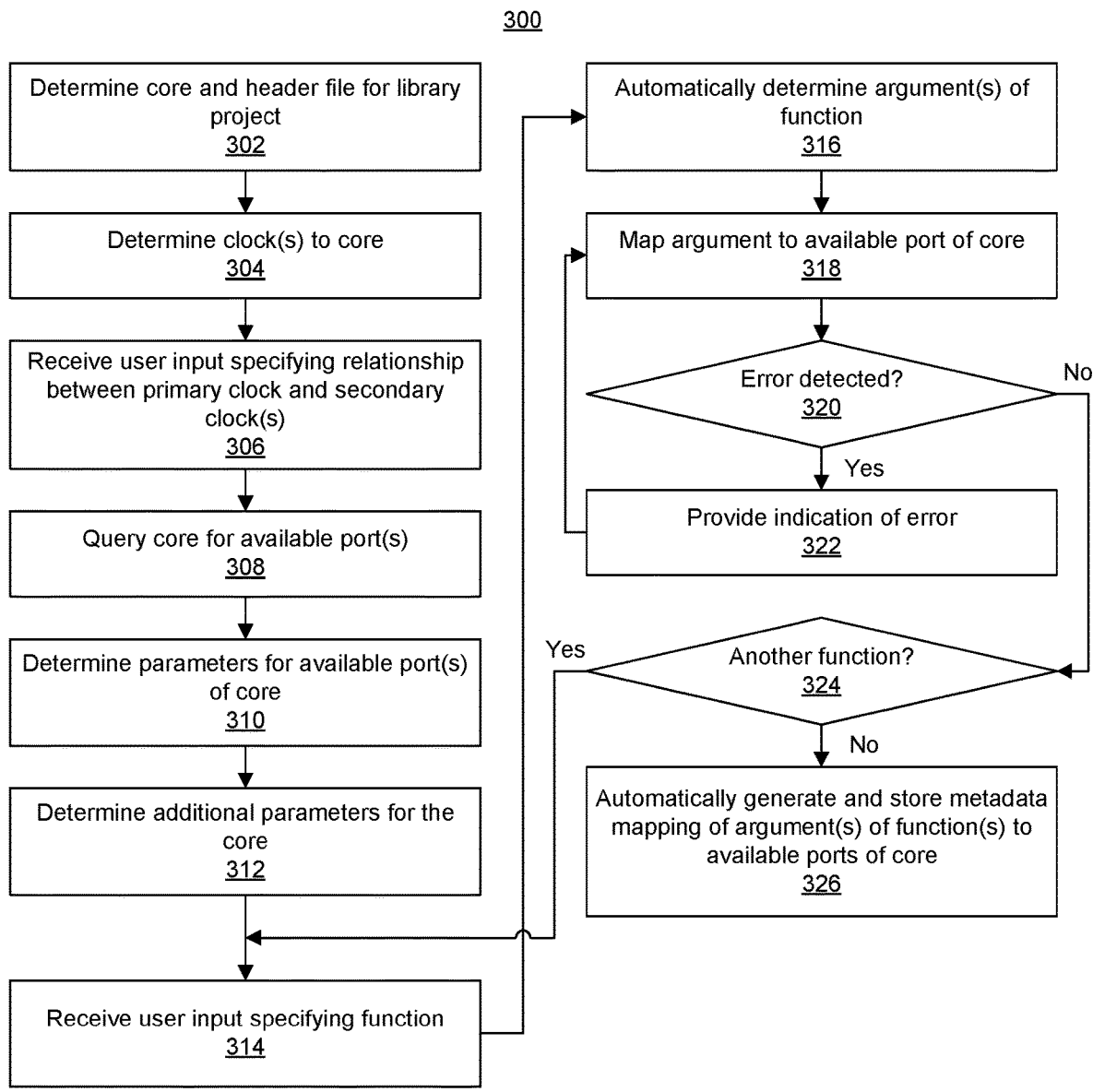
FIG. 3 illustrates an example method of generating a mapping metadata file that specifies a mapping of arguments of HLL functions to available ports of a core.

FIG. 3 illustrates an example method 300 of generating a mapping metadata file that specifies a mapping of arguments of HLL functions to available ports of a core. Method 300 can be performed by a system the same as or similar to the system described in connection with FIG. 1. In one or more embodiments, method 300 is used to implement block 208 of FIG. 2.

In block 302, the system determines a core and corresponding header file. The system, for example, is capable of receiving a user input specifying the core and the header file.

In block 304, the system is capable of automatically determining the available clock interfaces (e.g., clocks) to the core. For example, the system is capable of automatically searching the core metadata file to determine each of the clock interfaces of the core. In one or more embodiments, the system is capable of automatically determining, from the core metadata file, the primary clock of the core and/or determining a frequency of the primary clock of the core. In another example, the system is capable of receiving a user input specifying a frequency for the primary clock of the core.

In block 306, the system is capable of receiving one or more user inputs specifying a relationship between the primary clock and one or more secondary clocks of the core if, for example, the system determines that the core has one or more secondary clocks.

In block 308, the system is capable of automatically querying the core for available ports. The system, in response to determining the core for which an HLL library is to be generated, is capable of automatically searching the core metadata file to determine each of the available ports of the core specified therein. The available ports can include data input ports, data output ports, control ports (interfaces), and the like. The system, for example, is capable of searching for each port that is listed in the core metadata file of the core.

In block 308, the system is capable of querying the core metadata file. For example, the system is capable of parsing the core metadata file. In particular embodiments, the querying is performed based upon one of more user specified parameters for the core. As an illustrative and non-limiting example, as the user changes one or more parameters for the core, the changed parameters can cause a change in bitwidth of the ports of the core. Example 2 below illustrates a query and a result from the query for a core when the user has not provided an parameters for the core. Example 2 uses a command line style user interface.

Example 2

| | |
|---|---|
| Query: | sdx_pack -query-interface all -ip ../ip/fir_compiler_v7_2/component.xml |
| Result: | INFO: [RTL_PACK 83-0] axis interfaces:<br>INFO: [RTL_PACK 83-0] interface: M_AXIS_DATA, dir: out, width: 24<br>INFO: [RTL_PACK 83-0] interface: S_AXIS_CONFIG, dir: in, width: 1<br>INFO: [RTL_PACK 83-0] interface: S_AXIS_DATA, dir: in, width: 16<br>INFO: [RTL_PACK 83-0] interface: S_AXIS_RELOAD, dir: in, width: 1 |

Example 3 below illustrates a query and a result to the query in the case where the user has specified one or more parameters for the core (e.g., in lines 2-9 of Example 3). As illustrated, the results from the query directed to the same core vary due to the user specified parameters. Example 3 uses a command line style user interface.

Example 3

| | |
|---|---|
| Query: | sdx_pack -query-interface all -ip ../ip/fir_compiler_v7_2/component.xml \<br>  -param DATA_Has_TLAST="Packet_Framing" \<br>  -param M_DATA_Has_TREADY="true" \<br>  -param Coefficient_Width="8" \<br>  -param Data_Width="8" \<br>  -param Quantization="Integer_Coefficients" \<br>  -param Output_Rounding_Mode="Full_Precision" \<br>  -param Coefficient_Reload="true" \<br>  -param Coefficient_Structure="Non_Symmetric" |
| Result: | INFO: [RTL_PACK 83-0] axis interfaces:<br>INFO: [RTL_PACK 83-0] interface: M_AXIS_DATA, dir: out, width: 24<br>INFO: [RTL_PACK 83-0] interface: S_AXIS_CONFIG, dir: in, width: 8<br>INFO: [RTL_PACK 83-0] interface: S_AXIS_DATA, dir: in, width: 8<br>INFO: [RTL_PACK 83-0] interface: S_AXIS_RELOAD, dir: in, width: 8 |

In block 310, the system is capable of automatically determining parameters for the available ports. For example, the system is capable of searching the core metadata file to determine parameters for the available ports. The parameters can include, but are not limited to, the name of the port, the type of the port (e.g., AXI memory mapped, AXI stream or "AXIS", AXILite, etc.), data width, and direction. Examples of the parameters that can be determined for the ports are illustrated in Examples 2 and 3.

In block 312, the system is capable of automatically determining additional parameters for the core. For example, the system is capable of determining parameters such as a register mapping for settings of the core from the core metadata file. The register mapping can include a name and an offset for particular ports or interfaces. The system is also capable of determining interrupts and parameters that can be instantiated for the core and supported circuit boards of the core.

In block 314, the system is capable of receiving a user input specifying a function of the header file. In one or more embodiments, the system is capable of presenting the user with a list of the functions found in the header file or a list of the functions specified as HLL interface code templates. From the presented list, a user is capable of providing a user input selecting one of the presented functions.

In block 316, the system is capable of automatically determining the arguments of the function specified in block 314. For example, the system can parse the header file and locate the arguments for the specified function. In block 318, the system is capable of mapping the arguments of the specified function to available ports of the core. In one or more embodiments, the system receives a user input that specifies a particular argument to be associated with one of the available ports of the core. The user, for example, may continue to provide inputs to correlate each of the arguments of the selected function to ports of the core. The system is capable, however, of assisting the user in performing the mapping by automatically determining the available ports and the arguments to be mapped to such ports.

In block 320, the system is capable of performing an error check. The error check can be performed on any mapped arguments including any manually specified mappings. In one or more embodiments, the system is capable of performing the error check by comparing attributes of the arguments, as specified in the header file and/or in the HLL interface code templates, with parameters of the available ports as determined from the core metadata file. The system, for example, is capable of comparing argument attributes such as datatype, size, and/or direction with parameters to detect incompatibilities or mismatches of the arguments of the function to the available ports of the core.

As an illustrative and nonlimiting example, in response to a user specifying a mapping of an argument of the function to a port, the system compares attributes of the argument with the parameters of the mapped port. In this example, the argument is a 32-bit integer, while the port is an 8-bit port. In this example, the system automatically generates a notification that the argument does not match the mapped port. The user can then take corrective action and avoid compilation or hardware implementation errors. The system is capable of performing error checks and determining that the user specified mapping is incorrect (e.g., mismatched) given the header file and definition of the function that is provided therein as compared to the parameters of the mapped port.

In another example, the system is capable of comparing other attributes such as the type of target IC specified by the user or the type of board specified by the user against the type of IC and/or board that the core can be used with as specified in the core metadata file. The system is capable of detecting a mismatch (e.g., a target IC or board that is not supported by the core) and providing a notification of the mismatch to the user.

In response to determining that an error is detected, method 300 continues to block 322. In response to determining that no error is detected, method 300 continues to block 324.

In block 322, the system is capable of providing an indication of the detected error. For example, the system is capable displaying a notification indicating a mismatch between an attribute of an argument and a parameter of the port to which the argument has been mapped has been detected or that another error has been detected. After block 322, method 300 can loop back to block 320 where the mismatch can be corrected whether automatically or through further user corrective user input(s).

In block 324, the system determines whether another function remains to be processed. In response to determining that another function remains to be processed, method 300 loops back to block 314. In response to determining that no further functions remain to be processed, method 300 continues to block 326.

In block 326, the system automatically generates and stores the mapping metadata file that maps the arguments of the functions to the available ports of the core. The mapping metadata file can be stored in association with the HLL interface code templates and the core as previously described. It should be appreciated that the system is capable of including any of the information determined and/or received in method 300 within the mapping metadata file in addition to the mapping of arguments to available ports.

In the example of FIG. 3, the system is capable of querying the core metadata file to determine various items of information. In one or more other embodiments, the system is capable of analyzing the RTL code for the core to determine available ports and/or parameters for such ports.

Example 4 shows an example of a mapping metadata file that the system automatically generates in accordance with the example of FIG. 3. In other conventional systems, the mapping metadata file was manually coded by the user often leading to compilation and/or hardware errors. Example 4 illustrates a mapping of connections between HLL arguments X and Y of a function to ports S_AXIS_DATA and M_AXIS_DATA of a core.

Example 4

```
<xd:fcnMap                                xd:fcnName="fir"
    xd:componentRef="fir_compiler">
<xd:ctrlReg xd:type="none"/>
<xd:arg xd:name="X"
    xd:direction="in"
    xd: portInterfaceType="axis"
    xd:dataWidth="8"
    xd: busInterfaceRef="SAXIS DATA"
    xd:arraySize="32"/>
<xd:arg xd:name="Y"
    xd:direction="out"
    xd: portInterfaceType="axis"
    xd:dataWidth="16"
    xd: busInterfaceRef="MAXISDATA"
    xd:arraySize="32"/>
<xd:latencyEstimates xd:worst-case="17"
    xd:average-case="17"
    xd:best-case="17"/>
<xd:resourceEstimates    xd:BRAM="0"    xd:DSP="1"
    xd:FF="200" xd:LUT="200"/>
</xd:accMap>
```

As previously indicated, in some implementations, the mapping metadata file can include data indicating configuration settings for one or more parameters of the hardware implementation of the core. For example, the mapping metadata file can include a number of entries, each indicating a respective parameter name and a setting for the parameter. Example 5 shows an example entry in a metadata file that specifies settings for 7 parameters DATA_Has_TLAST, M_DATA_Has_TREADY, Coefficient_Width, Data_Width, Quantization, Output_Rounding_Mode, and Coefficient_Reload. The system is capable of automatically generating the metadata illustrated in Example 5 to specify settings for parameters based upon received user inputs. The inventive arrangements described herein are not intended to be limited to the data or formats shown in Examples 4 and 5. Rather, in other embodiments, the mapping metadata file can include other information and/or can store data in other formats.

Example 5

```
<?xml version="1.0" encoding="UTF-8"?>
<xd:component    xmlns:xd="http://www.xilinx.com/xi-
    dane"
    xd:name="fircompiler">
<xd:parameter             xd:name="DATA_Has_TLAST"
    xd:value="Packet_Framing"/>
<xd:parameter      xd:name="M_DATAHas_TREADY"
    xd:value="true"/>
<xd:parameter                xd:name="Coefficient_Width"
    xd:value="8"/>
<xd:parameter xd:name="Data_Width" xd:value="8"/>
<xd:parameter                     xd:name="Quantization"
    xd:value="Integer_Coefficients"/>
<xd:parameter      xd:name="Output_Rounding_Mode"
    xd:value="Full_Precision"/>
<xd:parameter                xd:name="Coefficient_Reload"
    xd:value="true"/>
</xd:component>
```

FIG. 4 is an example graphical user interface (GUI) 400 that can be generated and displayed on a display device by a system the same as or similar to the system described in connection with FIG. 1. The system is capable of displaying GUI 400 as part of an automated process of generating an HLL library for a core. In the examples described within this disclosure, the core can support multiple functions.

In the example of FIG. 4, a user has launched a development application and selected options to create a project called "mylib" and designated the project as a "C-Callable" library (e.g., an HLL callable library). Further aspects of the hardware upon which the user's application will run such as the target field programmable gate array (FPGA) as "Zynq", the platform (e.g., board on which the target FPGA is located) as "zc702", the runtime of C/C++, the system configuration of "Linux", the domain of "linux", the CPU type (e.g., that will execute the user's application) of "cortex-a9", and the operating system of "linux" have been specified for the project.

Any customizations of cores can be specified or listed in region 402 of GUI 400. A user can initiate the customization of a core for inclusion in the user's design by selecting the add IP customization icon 404. By selecting icon 404, the user is guided through an automated process for generating an HLL library that can be used by the user's HLL application to control a core implemented in hardware. The user can later select the add function mapping icon 406 to add a function mapping for the added core.

FIG. 5 is an example GUI 500 that can be generated and displayed on a display device by a system the same as or similar to the system described in connection with FIG. 1. The system is capable of displaying GUI 500 in response to the user's selection of add icon 404.

As pictured, GUI 500 includes a plurality of different fields through which a user can enter data. Some of the fields illustrated in FIG. 5 are automatically populated by the system. For example, field 502 is capable of receiving a user input specifying a header file. For purposes of illustration, consider the case where the header file of Example 1 is specified in field 502 corresponding to an FIR filter type of hardware accelerator.

Field 504 is capable of receiving a user input specifying the core that corresponds to the header file specified in field 502. In the example of FIG. 5, the user input can specify the core metadata file for the core. The header file specified in field 502, for example, specifies functions for the particular core specified in field 504. In this example, the core supports different functions such as "fir_reload", "fir_config", and "fir" as specified in the header file indicated in field 502. The "fir_reload" function reloads a set of coefficients into the hardware implementation of the core (e.g., the FIR filter). The "fir_config" function configures the hardware implementation of the core to operate using the correct set of coefficients. The "fir" function invokes the filter to operate on the provided arguments (e.g., data). By providing multiple different functions for the core, the hardware implementation of the core need not be reloaded with coefficients and/or reconfigured each time that the hardware implementation is called regardless of whether the same coefficients are to be re-used. Instead, the user's application is capable of using the "fir" function, for example, to continually call the hardware implementation of the core so long as the same coefficients are used to operate on the provided data.

Field 506 is capable of displaying an accelerator control protocol for the core. In one or more embodiments, the system, in response to a core being specified in field 504, is capable of analyzing the core metadata file to determine whether a control protocol is specified and used for the hardware implementation of the core. An example of a control protocol is AXI4-Lite IP Interface (IPIF). The AXI4-Lite IPIF provides a point-to-point bidirectional interface to a user core. Not all cores have a control protocol. Further, other, different control protocols such a SEMI Equipment Communications Standard/Generic Equipment Model (SECS/GEM) interface can be used. In cases where the system determines that the core supports more than one different control protocol, each available control protocol is specified as a selectable option, for example, in a drop-down list available from field 506. The user is capable of selecting one of the available control interfaces. Alternatively, in response to the system determining that the core supports a single control protocol, the system can automatically populate that control protocol into field 506. In response to the system determining that the core does not use or specify a control protocol, the system displays "None" in field 506.

In one or more embodiments, the system automatically identifies the primary clock of the core and populates the minimum clock period as specified by the core metadata file in field 508. Field 508 is also capable of receiving a user input specifying a minimum clock period for the primary clock of the core. Field 506 illustrates another example where the system is capable of comparing any user provided value in field 506 with the supported clock period(s) specified in the core metadata file and indicating any mismatch as a detected error.

In some cases, cores utilize multiple different clocks. In such cases, the system makes fields 510 and 512 available through which the user can specify a relationship between the primary clock and one or more secondary (e.g., derived) clocks by indicating a clock period multiplier or a clock period divisor to be used in specifying the frequency of the secondary clock(s).

In the example of FIG. 5, a single derived clock is illustrated as being detected. It should be appreciated that some cores have more than one derived clock. In that case, the system is capable of detecting each of the derived clocks and presenting corresponding fields for the user to specify the clock period dependencies of such clocks. Still, in other cases, the core does not have any derived clocks. In the latter case, the system either excludes the derived clock section from GUI 500 or disables the section.

FIG. 6 illustrates the state of region 402 of GUI 400 after the user has specified a particular header file "fir.hpp" and a particular core by specifying core metadata file "component.xml". In this example, the FIR filter has no control protocol since "none" is specified in the column titled "Accelerator Control".

Figures 7, 8:
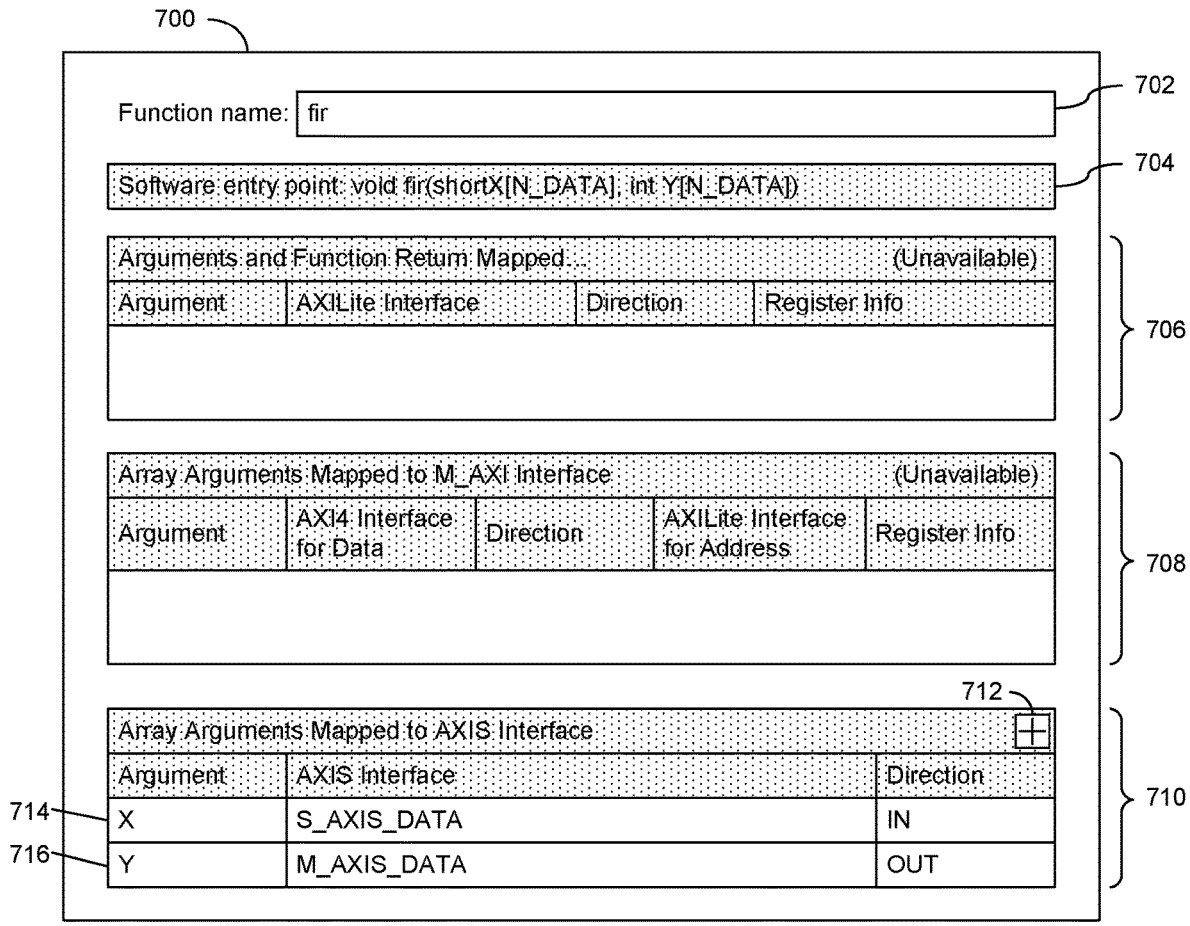
FIG. 7 is an example GUI that can be generated and displayed on a display device by a system as described in connection with FIG. 1.
FIG. 8 is an example GUI that can be generated and displayed on a display device by a system as described in connection with FIG. 1.

FIG. 7 illustrates another example GUI 700 that can be generated and displayed on a display device by a system the same as or similar to the system described in connection with FIG. 1. GUI 700 can be displayed by the system in response to a user input selecting icon 406 of FIG. 4.

GUI 700 includes a field 702 for specifying a particular function from the header file. In the example of FIG. 7, the system has parsed the header file and provided each of the functions specified therein as selectable options for field 702. For example, the system is capable of identifying each function of the header file in Example 1 and presenting the function as a selectable option as part of a drop-down menu accessible from field 702.

Region 704 displays the line entry from the header file for the selected function in field 702. In this example, the user has selected the "fir" function and the entire line defining the "fir" function from the header file is displayed in region 704. Region 706 can be used to specify argument to function mappings for an AXILite interface. Region 708 can be used to specify argument to function mappings for a memory mapped AXI interface. Because the specified core does not utilize either an AXILite interface or a memory mapped AXI interface, the system has disabled (e.g., rendered unavailable) regions 706 and 708 in the example of FIG. 7.

Region 710 displays argument to port mappings for the core for an AXI stream interface, which the core does have. In the example of FIG. 7, the user has selected icon 712, which first causes a blank line 714 to be shown. In one example, the system automatically populates an argument (e.g., X) from the "fir" function in the block of line 714 beneath "Argument". The user can select the block beneath "AXIS Interface" to view a drop-down style list including each port of the core that matches the attributes of the argument. In another example, the argument is not automatically populated and instead the user selects the block beneath "Argument" in line 714 to view a drop-down style list including each argument of the selected function. The user can select an argument therefrom. In one or more other embodiments, the system allows the user to type directly into each block or field of line 714 where the system autocompletes each entry based on the available arguments, ports, and directions. Line 716 can be populated with a mapping in the same or similar manner as line 714.

FIG. 8 illustrates the state of region 402 of GUI 400 after the user has saved the information illustrated in FIG. 7. As shown, in region 402 the X argument of the "fir" function is mapped to the M_AXIS_DATA port of the core with a parameter of "in". The Y argument of the "fir" function is mapped to the "M_AXIS_DATA" port of the core with a parameter of "out".

The data provided and/or determined through FIGS. 4-8 are added or included in the mapping metadata file generated by the system. Still, FIGS. 4-8 are provided for purposes of illustration and not limitation. The different GUIs and states thereof illustrate automated querying and processing performed by the system to facilitate automatic customization of a core and automated mapping of arguments to ports of the core. In one or more other embodiments, the various operations described in connection with FIGS. 4-8 can be performed through a command line tool. Further, as discussed, the operations described can be performed automatically by the system. The system can, for example, display one or more of the GUIs of FIGS. 4-8 to allow the user to override certain automatically determined mappings. In any case, the system is capable of generating a mapping metadata file as part of an HLL library for the core. The HLL library can be incorporated into an HLL user application that calls or uses a hardware implementation of the core implemented within programmable circuitry of the target IC.

Figure 9:
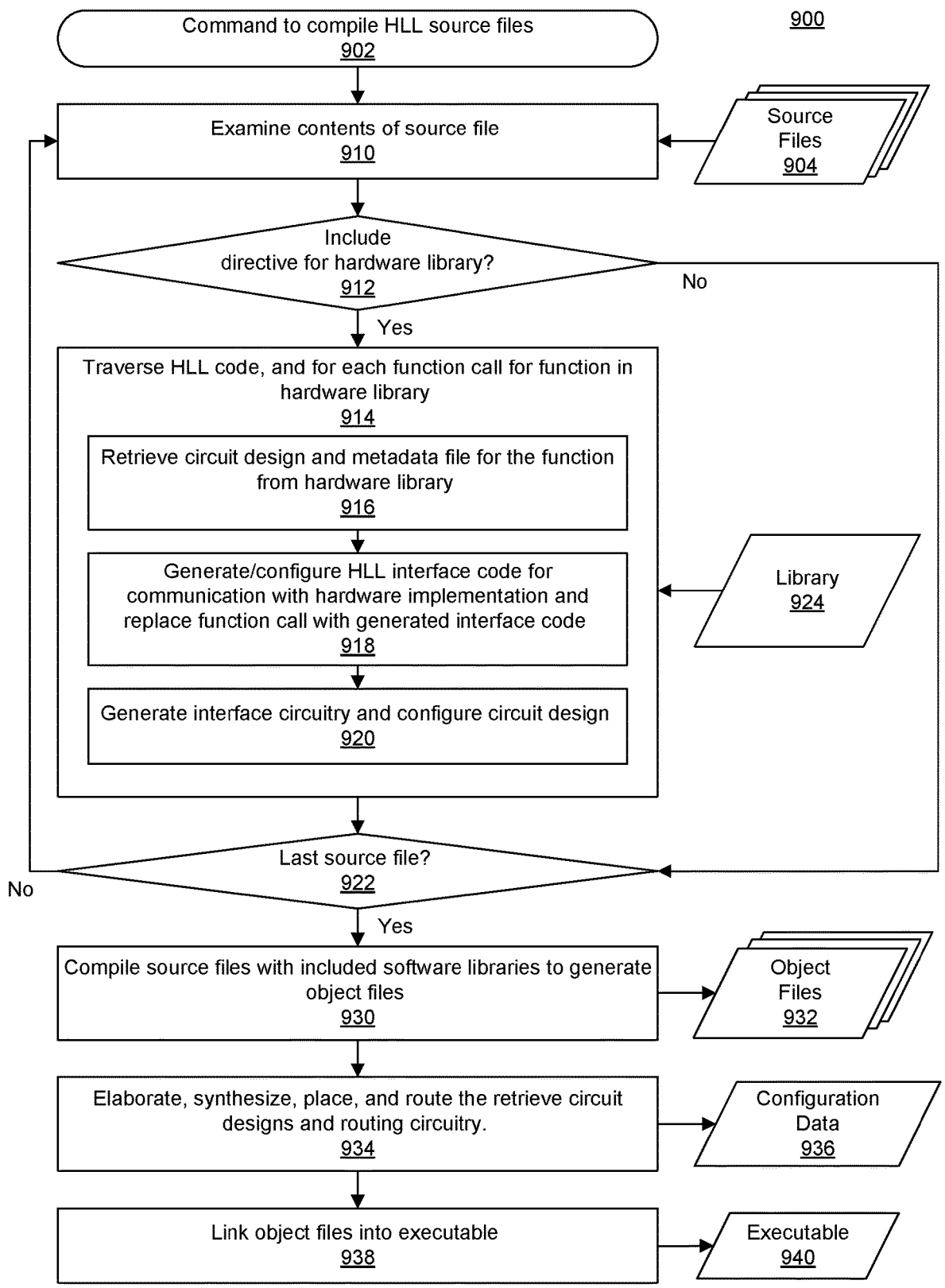
FIG. 9 illustrates an example method for compiling HLL code including a function call, from an HLL library, to a core.

FIG. 9 illustrates an example method 900 for compiling HLL code including a function call, from an HLL library, to a core. Method 900 can be performed by a system the same as or similar to the system described in connection with FIG. 1. FIG. 9 illustrates how the generated HLL library and mapping metadata file included therein are utilized to implement a user design.

Method 900 can be initiated by a command 902, received by the system, indicating one or more HLL source files to be compiled. In response to command 902 (e.g., a terminal command, an executable script command, or user input received via a GUI), the system examines a source file 904 indicated by command 902 in block 910. In block 912, the system determines whether the source file includes an include directive for library 924. Library 924 is an example of an HLL library generated as described herein in connection with FIGS. 2 and 3. In response to determining that the source file includes an include directive for library 924, method 900 continues to block 914.

In block 914, the system traverses the source file. In block 916, for each function call to a core that is included in library 924, e.g., each call to a function from the header file as previously described herein for a core, the system retrieves the RTL source file(s) and the mapping metadata file for the core. The mapping metadata file retrieved at block 916 indicates a mapping of arguments of the HLL function call to ports of the core. In some implementations, the mapping metadata file also describes default configuration settings for the RTL source file(s).

It should be appreciated that once the RTL source file(s) and/or a mapping metadata file is retrieved for a particular core, the system need not continually retrieve the same data when different functions for the core are encountered. For example, after retrieving the RTL source file(s) and/or the mapping metadata file in response to detecting the "fir_config" function for the FIR core, the system need not retrieve the same data in response to detecting the "fir_reload" or "fir" functions for the FIR filter.

In block 918, the system generates HLL interface code for communication with the circuit design. The generated HLL interface code communicates data between memory locations corresponding to arguments of the function call and ports of the hardware implementation of the RTL source file(s). The HLL interface code also synchronizes processes performed by the HLL source file and the hardware implementation of the RTL source file(s).

In one or more embodiments, the system generates the HLL interface code by supplementing or configuring each HLL interface code template from library 924 corresponding to a function call found in the source file. An example process for generation of HLL interface code is described in connection with FIG. 10. In addition, in block 918, the system replaces the function call in the source file with the HLL interface code specified in the HLL code template from library 924. As an illustrative and nonlimiting example, in the case where the source file includes a call to "fir_reload", the system replaces the call to "fir_reload" with the HLL interface code from the HLL interface code template for "fir_reload".

In block 920, the system configures the circuit design according to settings in the retrieved map data. For example, the system is capable of including the RTL source file(s) in a circuit design. The system is further capable of generating interface circuitry (e.g., data mover circuits) for bridging and routing signals between arguments of the HLL interface code and corresponding ports of the core in the circuit design mapped to the arguments per the mapping metadata file. In one or more embodiments, the generated interface circuitry (e.g., further RTL source code) is configured to communicate data using various communication protocols and/or communication circuits. For example, the interface circuit can provide hardware buffered connections for communicating data between the memory locations for the HLL arguments and corresponding or mapped ports of the circuit design.

In one or more other embodiments, the interface circuitry can include duplication circuits configured to route a single argument to multiple destinations. For instance, a duplication circuit can route data from a memory location for a first argument to a combination of other memory locations and/or ports of the circuit design. In some implementations, the routing circuitry includes a direct memory access (DMA) communication circuit configured to perform read or write data transactions initiated by either the HLL code running on a processor or by the circuit design.

The system further is capable of automatically connecting clock sources of the IC to the primary clock and a secondary clock based on the frequency for the primary clock and a specified frequency relationship between the primary clock and the secondary clock of the core.

The operations described in connection with blocks 910, 912, 914, 916, 918, and 920, can be repeated for each source file 904 until the last source file has been processed, as indicated by block 922. In block 930, the system compiles the source files to generate object files 932.

In block 934, the system synthesizes, places, and routes the circuit design including the RTL source files retrieved from library 924 and the generated interface circuits to produce a set of configuration data 936. During synthesis, the system can perform elaboration. During elaboration, RTL code for a circuit is expanded to produce a fully-expanded parse tree of all module instances invoked by the code. During synthesis, a netlist is created that specifies resources of a programmable IC to implement all of the module instances in the elaborated design. The configuration data is configured to program programmable resources of a target programmable IC to implement the circuit designs and interface circuits. During elaboration, the system is capable of determining that while three functions exist for the FIR filter, for example, each of the three functions is mapped to the same, e.g., single, instance of the FIR filter in the circuit design. As such, the system includes only a single instance of the FIR filter in the circuit design.

In conventional systems, each different function is interpreted as corresponding to a different instance of the FIR filter. For example, a conventional system detecting three functions as described herein (e.g., the three different functions for the FIR filter) would implement three instances of the FIR filter in the resulting circuit design and three hardware implementations of the FIR filter in the programmable circuitry, where each different function is incorrectly mapped to one instance of the FIR filter in hardware.

In block 938, the system links the object files 932 into an executable 940. In performing the linking, the system may utilize some information generating during elaboration as performed during block 934.

The inventive arrangements described herein, by including the three functions in a same header file corresponding to the hardware accelerator, are identified by the system as being mapped to a same, e.g., a single, instance of the core. As such, the system includes only a single instance of the FIR filter in the circuit design that is mapped to each of the functions of the header file. Similarly, the resulting hardware implementation of the circuit design includes a single hardware implementation of the FIR filter that is accessed by each of the three functions as executed by a processor in the target IC.

Figure 10:
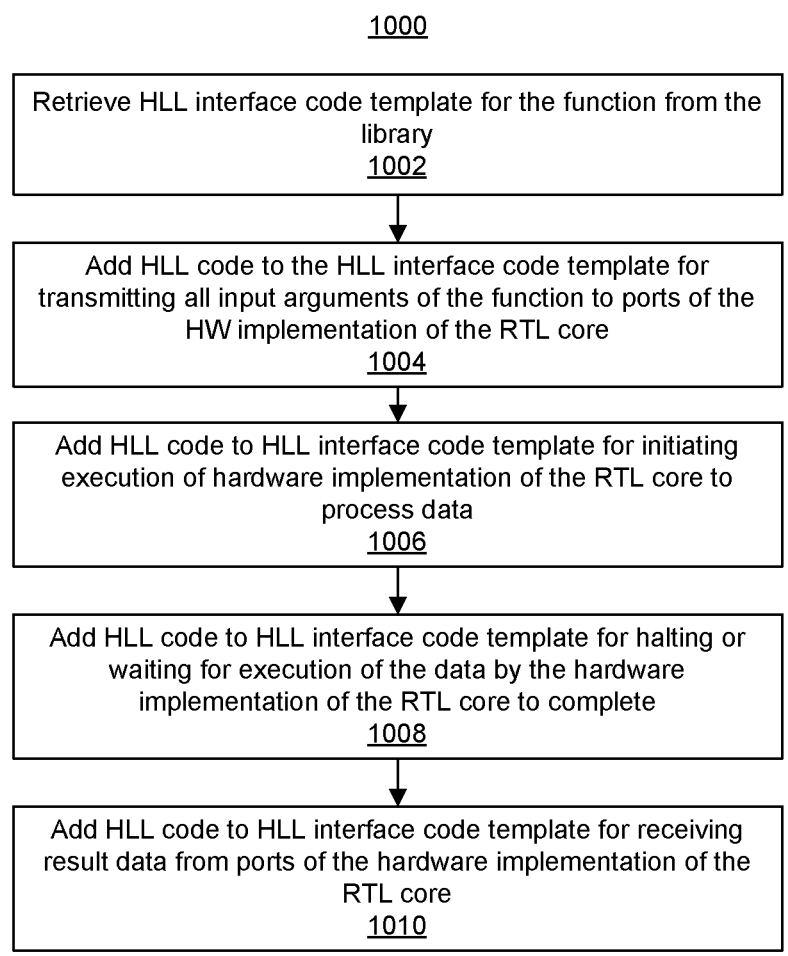
FIG. 10 illustrates an example method for generating HLL code for communication with a hardware implementation of a core.

FIG. 10 illustrates an example method 1000 for generating HLL code for communication with a hardware implementation of a core. Method 1000 can be performed by a system the same as or similar to the system described in connection with FIG. 1. In block 1002, the system retrieves an HLL interface code template for the core from the library. The HLL interface code template includes the same arguments as the HLL function call to the core.

In block 1004, the system adds HLL code to the body of the HLL interface code template. The added HLL code directs transmission of specified arguments of the HLL interface code template to the mapped ports of the hardware implementation of the core. The system uses the mapping metadata file that has been generated to direct the specified arguments of the HLL interface code to the correct ports of the circuit design.

In block 1006, the system adds HLL code to the HLL interface code template to initiate execution of the hardware implementation of the core to process data. In block 1008, the system adds HLL code to the body of the HLL interface code template to cause the HLL function to halt or wait for processing of the data by the hardware implementation of the core to complete. In block 1010, the system adds HLL code to the HLL interface code template to receive result data from ports of the hardware implementation of the core.

Again, the system uses the mapping metadata file to generate correct HLL code to retrieve the result data from the correct ports of the hardware implementation of the core. In some implementations, the code generated in blocks 1004 and 1010 calls additional lower level interface code for communication with the netlist that is generated later at link time (once data sizes are resolved).

For additional information regarding generation of interface code and interface circuits and/or synthesis of HDL circuits from HLL code, reference may be made to U.S. Pat. No. 8,762,916, titled AUTOMATIC GENERATION OF A DATA TRANSFER NETWORK; U.S. Pat. No. 8,775,986, titled SOFTWARE DEBUGGING OF SYNTHESIZED HARDWARE; and U.S. Pat. No. 9,075,624, titled METHOD FOR COMPILING PROGRAMS FOR PROCESSORS WITH PROGRAMMABLE LOGIC, which are fully incorporated by reference herein.

Figure 11:
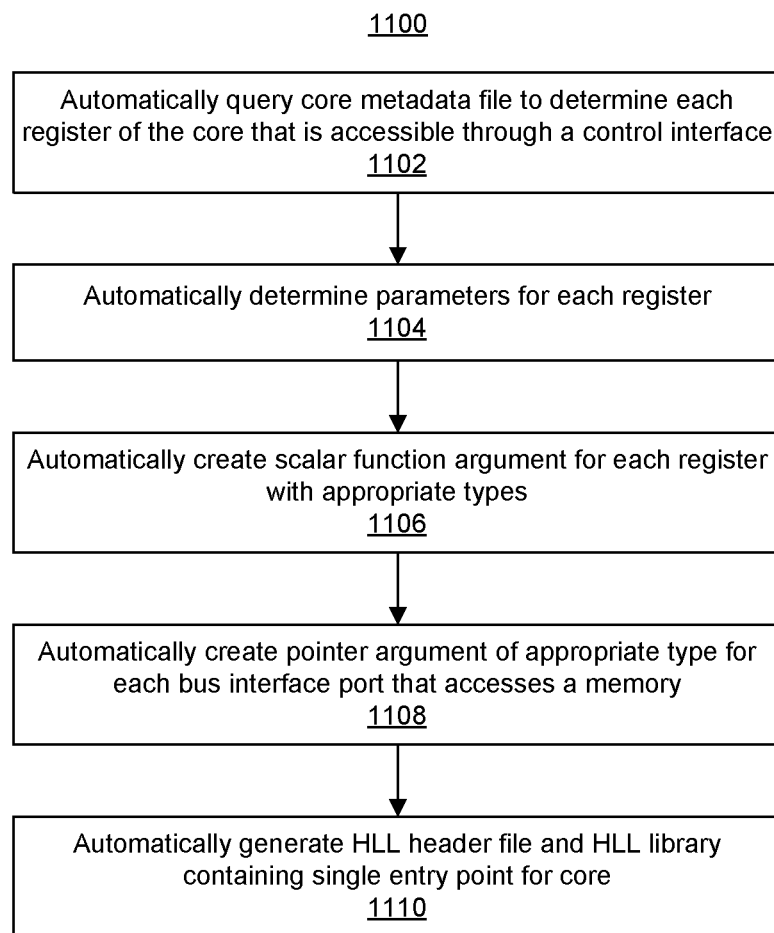
FIG. 11 illustrates another example method for generating an HLL library for a core.

FIG. 11 illustrates another example method 1100 for generating an HLL library for a core. Method 1100 can be performed by a system the same as or similar to the system described in connection with FIG. 1. In the example of FIG. 11, the system does not utilize an existing HLL component (e.g., an HLL header file or HLL interface code templates). In the example of FIG. 11, the system is capable of creating the header file automatically.

In block 1102, the system is capable of automatically querying the core metadata file of a selected core to determine each register of the core that is accessible through a control interface of the core. An example of a control interface is an AXILite slave interface specified in the core metadata file. In block 1104, the system is capable of automatically determining parameters for each register such as, e.g., bit-width, offset, and direction. In block 1106, the system creates a scalar function argument for each of the registers determined in block 1102. The scalar function arguments have appropriate types (e.g., bit-width, offset, and direction) based on the correlated register. That is, the scalar function argument generated for each register is created with the same bit-width and direction. In block 1108, the system automatically creates a pointer argument of an appropriate type for each bus interface port that accesses a memory (e.g., each stream (AXI Stream master or slave) and for each bus master (e.g., AXI4) that accesses memory). In block 1110, the system automatically generates an HLL header file and an HLL library containing a single entry point for the core specifying a mapping for each of the plurality of registers of the control interface to corresponding ones of the plurality of scalar arguments and a mapping of the pointer argument to the bus interface port.

From the single point of entry generated in the example of FIG. 11, multiple points of entry, e.g., multiple functions, can be generated. A user, for example, is capable of editing the resulting file generated in FIG. 11 to specify multiple functions based on the single point of entry. Once the multiple functions are specified, the resulting header file and may be processed as described herein to automatically create the HLL library. In this example, no header file or HLL source files (e.g., templates) are needed to initiate the automatic generation of the HLL library. The system need only access the core metadata file.

Figure 12:
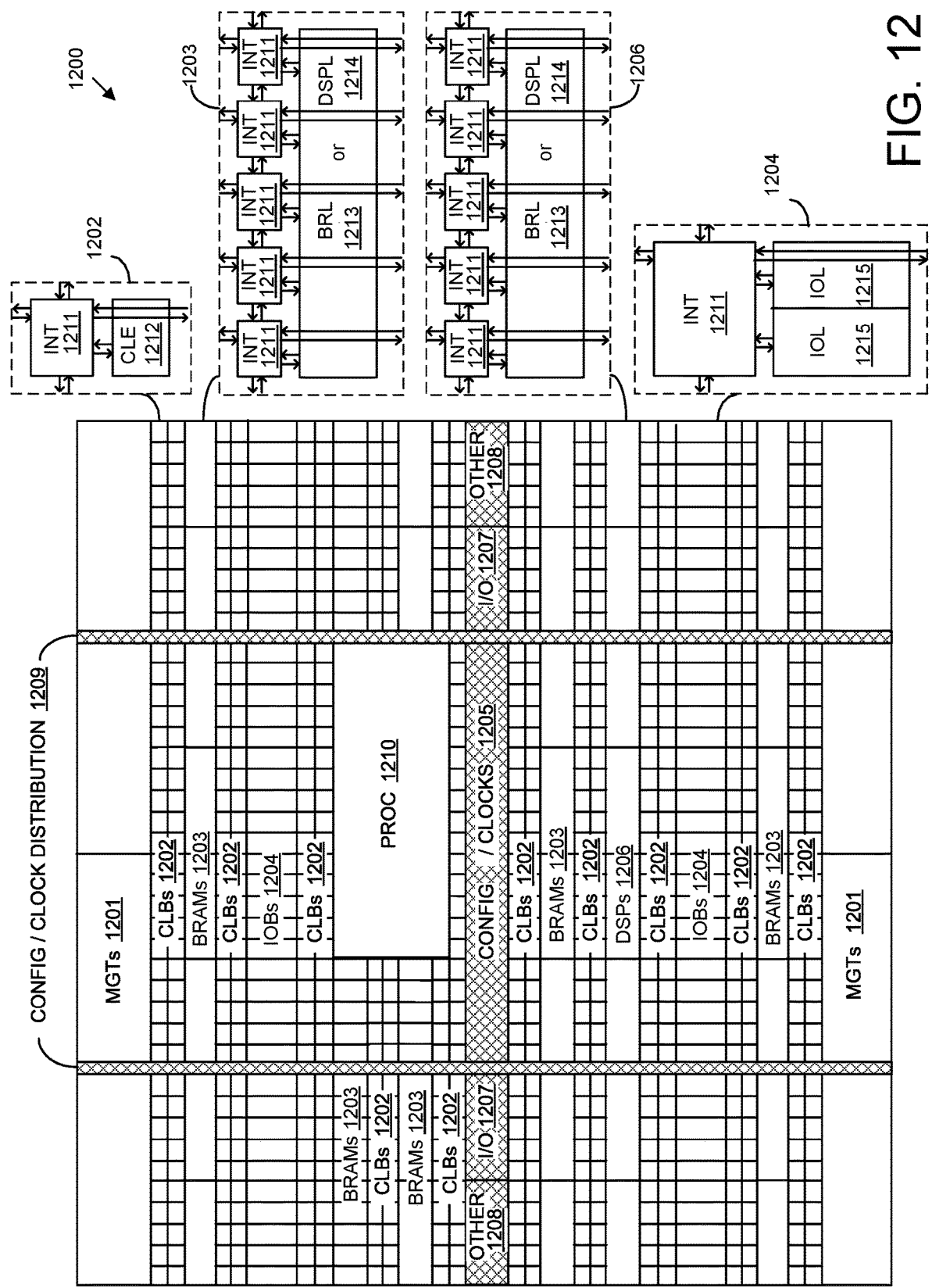
FIG. 12 illustrates an example architecture for an integrated circuit (IC).

FIG. 12 illustrates an example architecture 1200 for an IC. In one aspect, architecture 1200 can be implemented within a programmable IC. For example, architecture 1200 can be used to implement a field programmable gate array (FPGA). Architecture 1200 is also representative of a system-on-chip (SoC) type of IC. An SoC is an IC that includes a processor that executes program code and one or more other circuits.

The other circuits can be implemented as hardwired circuitry, programmable circuitry, and/or a combination thereof. The circuits can operate cooperatively with one another and/or with the processor.

As shown, architecture 1200 includes several different types of programmable circuit, e.g., logic, blocks. For example, architecture 1200 can include a large number of different programmable tiles including multi-gigabit transceivers (MGTs) 1201, configurable logic blocks (CLBs) 1202, random access memory blocks (BRAMs) 1203, input/output blocks (IOBs) 1204, configuration and clocking logic (CONFIG/CLOCKS) 1205, digital signal processing blocks (DSPs) 1206, specialized I/O blocks 1207 (e.g., configuration ports and clock ports), and other programmable logic 1208 such as digital clock managers, analog-to-digital converters, system monitoring logic, and so forth.

In some ICs, each programmable tile includes a programmable interconnect element (INT) 1211 having standardized connections to and from a corresponding INT 1211 in each adjacent tile. Therefore, INTs 1211, taken together, implement the programmable interconnect structure for the illustrated IC. Each INT 1211 also includes the connections to and from the programmable logic element within the same tile, as shown by the examples included at the top of FIG. 12.

For example, a CLB 1202 can include a configurable logic element (CLE) 1212 that can be programmed to implement user logic plus a single INT 1211. A BRAM 1203 can include a BRAM logic element (BRL) 1213 in addition to one or more INTs 1211. Typically, the number of INTs 1211 included in a tile depends on the height of the tile. As pictured, a BRAM tile has the same height as five CLBs, but other numbers (e.g., four) also can be used. A DSP tile 1206 can include a DSP logic element (DSPL) 1214 in addition to an appropriate number of INTs 1211. An 10B 1204 can include, for example, two instances of an I/O logic element (IOL) 1215 in addition to one instance of an INT 1211. The actual I/O pads connected to IOL 1215 may not be confined to the area of IOL 1215.

In the example pictured in FIG. 12, a columnar area near the center of the die, e.g., formed of regions 1205, 1207, and 1208, can be used for configuration, clock, and other control logic. Horizontal areas 1209 extending from this column can be used to distribute the clocks and configuration signals across the breadth of the programmable IC.

Some ICs utilizing the architecture illustrated in FIG. 12 include additional logic blocks that disrupt the regular columnar structure making up a large part of the IC. The additional logic blocks can be programmable blocks and/or dedicated circuitry. For example, a processor block depicted as PROC 1210 spans several columns of CLBs and BRAMs.

In one aspect, PROC 1210 can be implemented as dedicated circuitry, e.g., as a hardwired processor, that is fabricated as part of the die that implements the programmable circuitry of the IC. PROC 1210 represents any of a variety of different processor types and/or systems ranging in complexity from an individual processor, e.g., a single core capable of executing program code, to an entire processor system having one or more cores, modules, co-processors, interfaces, or the like.

In another aspect, PROC 1210 can be omitted from architecture 1200 and replaced with one or more of the other varieties of the programmable blocks described. Further, such blocks can be utilized to form a "soft processor" in that the various blocks of programmable circuitry can be used to form a processor that can execute program code as is the case with PROC 1210.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 12 that are external to PROC 1210 such as CLBs 1202 and BRAMs 1203 are considered programmable circuitry of the IC.

In general, the functionality of programmable circuitry is not established until configuration data is loaded into the IC. A set of configuration bits can be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1210.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream can specify the circuitry that is to be implemented within the programmable circuitry and the program code that is to be executed by PROC 1210 or a soft processor. In some cases, architecture 1200 includes a dedicated configuration processor that loads the configuration bitstream to the appropriate configuration memory and/or processor memory. The dedicated configuration processor does not execute user-specified program code. In other cases, architecture 1200 can utilize PROC 1210 to receive the configuration bitstream, load the configuration bitstream into appropriate configuration memory, and/or extract program code for execution.

FIG. 12 is intended to illustrate an example architecture that can be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 12 are purely illustrative. In an actual IC, for example, more than one adjacent column of CLBs is typically included wherever the CLBs appear, to facilitate the efficient implementation of a user circuit design. The number of adjacent CLB columns, however, can vary with the overall size of the IC. Further, the size and/or positioning of blocks such as PROC 1210 within the IC are for purposes of illustration only and are not intended as limitations.

A system as described herein in connection with FIG. 1, for example, is capable of loading the resulting executable and the resulting configuration bitstream (placed and routed circuit design) into an IC having an architecture the same as or similar to that of FIG. 12. The processor is capable of executing the executable. The programmable circuitry physically implements the hardware accelerators (e.g., the cores and any data mover/interface circuitry to the processor) specified in the configuration bitstream. The processor, in executing the executable, is capable of controlling and/or accessing the hardware accelerator using the HLL library for the hardware accelerator.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" means that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium includes: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a method can include automatically querying, using computer hardware, a metadata description of a core to determine a plurality of available ports of the core, automatically determining, using the computer hardware, an argument of a first function specified in a header file corresponding to the core, mapping, using the computer hardware, the argument to a first port of the plurality of available ports, and automatically generating and storing, using the computer hardware, a high-level language (HLL) library specifying a mapping of the argument to the first port of the core. The HLL library is configured for inclusion with a user application during compilation.

In one aspect, the automatically generating and storing the high-level language library includes generating a metadata file specifying a mapping of the argument to the first port.

In another aspect, the method includes generating high-level language code implementing at least a portion of the first function using the mapping.

In another aspect, the method includes creating an executable version of the user application including the high-level language library.

In another aspect, the method includes automatically determining an argument of a second function corresponding to the core and mapping the argument of the second function to a second port of the plurality of available ports. The high-level language library specifies a mapping of the argument of the second function to the second port.

In another aspect, the first function and the second function are executable to access a same instance of the core implemented as hardware within an integrated circuit.

In another aspect, the method includes automatically querying the metadata description of the core to determine parameters for the plurality of available ports and automatically determining an attribute of the argument of the first function.

In another aspect, the method includes, in response to detecting an incompatibility between the argument of the first function and the first port based on the attributes and the parameter, providing an indication of the incompatibility.

In another aspect, the method includes automatically determining a frequency for a primary clock of the core and generating a circuit design including the core by automatically connecting clock sources within an integrated circuit to the primary clock and a secondary clock based on the frequency for the primary clock and a specified frequency relationship between the primary clock and the secondary clock of the core.

In another aspect, the core is hierarchical and the automatically querying the metadata description determines available ports from a plurality of levels of a hierarchy of the core.

In one or more embodiments, a system includes a processor configured to initiate operations. The operations can include automatically querying a metadata description of a core to determine a plurality of available ports of the core, automatically determining an argument of a first function specified in a header file corresponding to the core, mapping the argument to a first port of the plurality of available ports, and automatically generating and storing a HLL library specifying a mapping of the argument to the first port of the core. The HLL library is configured for inclusion with a user application during compilation.

In one aspect, the automatically generating and storing the high-level language library includes generating a metadata file specifying a mapping of the argument to the first port.

In another aspect, the processor is configured to initiate operations further including generating high-level language code implementing at least a portion of the first function using the mapping.

In another aspect, the processor is configured to initiate operations further including creating an executable version of the user application including the high-level language library.

In another aspect, the processor is configured to initiate operations further including automatically determining an argument of a second function corresponding to the core and mapping the argument of the second function to a second port of the plurality of available ports. The high-level language library specifies a mapping of the argument of the second function to the second port.

In another aspect, the first function and the second function are executable to access a same instance of the core implemented as hardware within an integrated circuit.

In another aspect, the processor is configured to initiate operations further including automatically querying the metadata description of the core to determine parameters for the plurality of available ports and automatically determining an attribute of the argument of the first function.

In another aspect, the processor is configured to initiate operations further including, in response to detecting an incompatibility between the argument of the first function and the first port based on the attributes and the parameter, providing an indication of the incompatibility.

In another aspect, the processor is configured to initiate operations further including automatically determining a frequency for a primary clock of the core and generating a circuit design including the core by automatically connecting clock sources within an integrated circuit to the primary clock and a secondary clock based on the frequency for the primary clock and a specified frequency relationship between the primary clock and the secondary clock of the core.

In one or more embodiments, a computer program product includes a computer readable storage medium having program code stored thereon. The program code is executable by a processor to perform operations. The operations can include automatically querying a metadata description of a core to determine a plurality of available ports of the core, automatically determining an argument of a first function specified in a header file corresponding to the core, mapping the argument to a first port of the plurality of available ports, and automatically generating and storing a HLL library specifying a mapping of the argument to the first port of the core. The HLL library is configured for inclusion with a user application during compilation.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   querying, using computer hardware, a metadata description of a core to determine a plurality of available ports of the core and parameters for the plurality of available ports;
   determining, from a header file corresponding to the core and using the computer hardware, an argument of a first function corresponding to the core and an attribute of the argument of the first function;
   mapping, using the computer hardware, the argument to a first port of the plurality of available ports;
   checking for compatibility between the argument of the first function and the first port based on the attribute of the argument and a parameter of the first port;
   automatically generating and storing, using the computer hardware, a high-level language library specifying a mapping of the argument to the first port of the core; and
   wherein the high-level language library is configured for inclusion with a user application during compilation, and wherein the compiled user application is executable by a processor to invoke the first function of the core.

2. The method of claim 1, wherein the automatically generating and storing the high-level language library comprises:
   generating a metadata file specifying a mapping of the argument to the first port.

3. The method of claim 2, further comprising:
   generating high-level language code implementing at least a portion of the first function using the mapping.

4. The method of claim 1, further comprising:
   creating an executable version of the user application including the high-level language library.

5. The method of claim 1, further comprising:

automatically determining an argument of a second function corresponding to the core; and mapping the argument of the second function to a second port of the plurality of available ports;

wherein the high-level language library specifies a mapping of the argument of the second function to the second port.

6. The method of claim 5, wherein the first function and the second function are executable to access a same instance of the core implemented as hardware within an integrated circuit.

7. The method of claim 1, further comprising:

in response to detecting an incompatibility between the argument of the first function and the first port based on the attributes and the parameter, providing an indication of the incompatibility.

8. The method of claim 1, further comprising:

automatically determining a frequency for a primary clock of the core; and generating a circuit design including the core by automatically connecting clock sources within an integrated circuit to the primary clock and a secondary clock based on the frequency for the primary clock and a specified frequency relationship between the primary clock and the secondary clock of the core.

9. The method of claim 1, wherein the core is hierarchical and the automatically querying the metadata description determines the plurality of available ports from a plurality of levels of a hierarchy of the core.

10. A system, comprising:

a processor configured to initiate operations including:

querying a metadata description of a core to determine a plurality of available ports of the core and parameters for the plurality of available ports;

automatically determining, from a header file corresponding to the core, an argument of a first function corresponding to the core and an attribute of the argument of the first function;

mapping the argument to a first port of the plurality of available ports;

checking for compatibility between the argument of the first function and the first port based on the attribute of the argument and a parameter of the first port;

automatically generating and storing a high-level language library specifying a mapping of the argument to the first port of the core; and wherein the high-level language library is configured for inclusion with a user application during compilation, and wherein the compiled user application is executable by a processor to invoke the first function of the core.

11. The system of claim 10, wherein the automatically generating and storing the high-level language library comprises:

generating a metadata file specifying a mapping of the argument to the first port.

12. The system of claim 11, wherein the processor is configured to initiate operations further comprising:

generating high-level language code implementing at least a portion of the first function using the mapping.

13. The system of claim 10, wherein the processor is configured to initiate operations further comprising:

creating an executable version of the user application including the high-level language library.

14. The system of claim 10, wherein the processor is configured to initiate operations further comprising:

automatically determining an argument of a second function corresponding to the core; and mapping the argument of the second function to a second port of the plurality of available ports;

wherein the high-level language library specifies a mapping of the argument of the second function to the second port.

15. The system of claim 14, wherein the first function and the second function are executable to access a same instance of the core implemented as hardware within an integrated circuit.

16. The system of claim 10, wherein the processor is configured to initiate operations further comprising:

in response to detecting an incompatibility between the argument of the first function and the first port based on the attributes and the parameter, providing an indication of the incompatibility.

17. The system of claim 10, wherein the processor is configured to initiate operations further comprising:

automatically determining a frequency for a primary clock of the core; and generating a circuit design including the core by automatically connecting clock sources within an integrated circuit to the primary clock and a secondary clock based on the frequency for the primary clock and a specified frequency relationship between the primary clock and the secondary clock of the core.

18. A method, comprising:

automatically querying a metadata description of a core to determine a plurality of registers of a control interface of the core;

creating a plurality of scalar arguments corresponding to the plurality of registers and having respective types matching respective types of the plurality of registers;

creating a pointer argument for each bus interface port that accesses memory, wherein a type of each pointer argument matches a type of the corresponding bus interface port; and automatically generating a high-level language header file and a high-level language library containing a single entry point for the core specifying a mapping for each of the plurality of registers of the control interface to corresponding ones of the plurality of scalar arguments and a mapping of the pointer argument to the bus interface port.

* * * * *